United States Patent
Wu (10) Patent No.: US 11,838,655 B2
(45) Date of Patent: Dec. 5, 2023

(54) IMAGE ACQUIRING METHOD AND APPARATUS, ELECTRONIC DEVICE, AND STORAGE MEDIUM

(71) Applicant: BEIJING XIAOMI MOBILE SOFTWARE CO., LTD, Beijing (CN)

(72) Inventor: Jun Wu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 17/709,079

(22) Filed: Mar. 30, 2022

(65) Prior Publication Data
US 2022/0350227 A1    Nov. 3, 2022

(30) Foreign Application Priority Data
Apr. 28, 2021 (CN) .......................... 202110467157.5

(51) Int. Cl.
*H04N 23/957* (2023.01)
*H04N 23/63* (2023.01)

(52) U.S. Cl.
CPC ......... *H04N 23/957* (2023.01); *H04N 23/632* (2023.01)

(58) Field of Classification Search
None
See application file for complete search history.

(56) References Cited

U.S. PATENT DOCUMENTS

| | | | | |
|---|---|---|---|---|
| 2008/0309813 | A1* | 12/2008 | Watanabe | G02B 27/46 348/340 |
| 2013/0076931 | A1* | 3/2013 | Border | H04N 23/843 348/222.1 |
| 2014/0176663 | A1 | 6/2014 | Cutler et al. | |

OTHER PUBLICATIONS

Extended European Search Report issued in Application No. 2165660. 6, dated Sep. 20, 2022,(8p).
Extended European Search Report issued in Application No. 22165660. 6, dated Sep. 20, 2022,(8p).

* cited by examiner

*Primary Examiner* — James M Hannett
(74) *Attorney, Agent, or Firm* — Arch & Lake LLP (57) ABSTRACT

An image acquiring method includes: providing a camera module of an electronic device including a lens assembly, a microlens matrix and an image sensor, the microlens matrix is movable between a first position and a second position, the microlens matrix is between the image sensor and the lens assembly in the first position to enable the camera module as a light field camera, and the microlens matrix is away from the image sensor and the lens assembly in the second position to enable the camera module as a conventional camera; in response to detecting that the microlens matrix is in the first position, acquiring a three-dimensional image of an object by the light field camera of the electronic device; and in response to detecting that the microlens matrix is in the second position, acquiring a two-dimensional image of the object by the conventional camera.

13 Claims, 5 Drawing Sheets

IMAGE ACQUIRING METHOD AND APPARATUS, ELECTRONIC DEVICE, AND STORAGE MEDIUM

CROSS-REFERENCE TO RELATED APPLICATIONS

This application is based on and claims priority to Chinese Patent Application No. 202110467157.5, filed on Apr. 28, 2021, the entire content of which is incorporated herein by reference for all purposes.

TECHNICAL FIELD

The present disclosure relates to the field of image processing, specifically to an image acquiring method and apparatus, an electronic device, and a storage medium.

BACKGROUND

A conventional camera normally includes only an image sensor and a lens assembly along a travel path of light, such that the light passing through the lens assembly is collected by the image sensor, when an object is photographed by the conventional camera. Accordingly, an image shot by the conventional camera is mostly a two-dimensional image.

A light field camera is an unconventional camera with a special structure, where a microlens matrix (also known as a microlens array) is additionally incorporated between the lens assembly and the image sensor on the basis of the conventional camera. Because of this special structure, the light field camera records depth information of the object in the process of shooting an image. Accordingly, the image shot by the light field camera is a three-dimensional image with the depth information.

In the related art, the two-dimensional image is obtained by the conventional camera, while the three-dimensional image is obtained by the light field camera. However, such two cameras are normally presented independently and there is not provided a method yet that shoots the three-dimensional image and the two-dimensional image by one same electronic device.

SUMMARY

The present disclosure provides an image acquiring method, a camera module, and an electronic device thereof.

According to a first aspect of the present disclosure, an image acquiring method includes: providing a camera module of an electronic device, wherein the camera module includes a lens assembly, a microlens matrix and an image sensor, the microlens matrix is movable between a first position and a second position, the microlens matrix is between the image sensor and the lens assembly in the first position to enable the camera module as a light field camera, and the microlens matrix is away from the image sensor and the lens assembly in the second position to enable the camera module as a conventional camera; in response to detecting that the microlens matrix is in the first position, acquiring a three-dimensional image of an object by the light field camera of the electronic device, wherein the light field camera includes the image sensor, the microlens matrix and the lens assembly; the image sensor, the microlens matrix and the lens assembly are arranged in sequence; and the microlens matrix is located between the image sensor and the lens assembly; and in response to detecting that the microlens matrix is in the second position, acquiring a two-dimensional image of the object by the conventional camera, wherein the conventional camera includes the image sensor and the lens assembly arranged in sequence, and the microlens matrix is located away from the image sensor and the lens assembly.

According to a second aspect of the present disclosure, a camera module includes: a lens assembly, a microlens matrix and an image sensor, wherein the lens assembly includes at least one lens; the microlens matrix, including a plurality of microlenses, is movable between a first position and a second position, wherein the microlens matrix is between the image sensor and the lens assembly in the first position to enable the camera module as a light field camera, and the microlens matrix is away from the image sensor and the lens assembly in the second position to enable the camera module as a conventional camera; and the image sensor is for collecting light passing through the lens assembly, or collecting light passing through the lens assembly and the microlens matrix in sequence.

According to a third aspect of the present disclosure, an electronic device includes: a processor, and a memory, storing a processor-executable instruction, wherein the processor, by executing the executable instruction, implements an image acquiring method including: providing a camera module of an electronic device, wherein the camera module includes a lens assembly, a microlens matrix and an image sensor, the microlens matrix is movable between a first position and a second position, the microlens matrix is between the image sensor and the lens assembly in the first position to enable the camera module as a light field camera, and the microlens matrix is away from the image sensor and the lens assembly in the second position to enable the camera module as a conventional camera; in response to detecting that the microlens matrix is in the first position, acquiring a three-dimensional image of an object by the light field camera of the electronic device, wherein the light field camera includes the image sensor, the microlens matrix and the lens assembly; the image sensor, the microlens matrix and the lens assembly are arranged in sequence; and the microlens matrix is located between the image sensor and the lens assembly; and in response to detecting that the microlens matrix is in the second position, acquiring a two-dimensional image of the object by the conventional camera, wherein the conventional camera includes the image sensor and the lens assembly arranged in sequence, and the microlens matrix is located away from the image sensor and the lens assembly.

BRIEF DESCRIPTION OF THE DRAWINGS

The accompanying drawings, which are incorporated in and constitute a part of this specification, illustrate examples consistent with the present disclosure and, together with the description, serve to explain the principles of the present disclosure.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the present disclosure. Instead, they are merely examples of apparatuses and methods consistent with aspects related to the present disclosure as recited in the appended claims.

The terms used in the present disclosure is for the purpose of describing particular embodiments only and is not intended to limit the present disclosure. As used in the present disclosure and the appended claims, the singular forms "a," "the," and "the" are intended to include the plural forms as well, unless the context clearly dictates otherwise. It will also be understood that the term "and/or" as used in the present disclosure refers to and includes any and all possible combinations of one or more of the associated listed items.

It should be understood that terms such as "first," "second," and "third" are used herein for describing various information, but the information should not be limited by these terms. The terms are only used for distinguishing the information of the same type from each other. For example, first information may also be called second information, and similarly, the second information may also be called the first information, without departing from the scope of the present disclosure. As used herein, the term "if" may be construed to mean "when" or "upon" or "in response to determining," depending on the context.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components that are directly or indirectly linked together, so as to perform a particular function.

A camera module of an electronic device such as a smart phone, a tablet computer and the like, generally includes only a lens assembly and an image sensor, to shoot an image by a conventional camera composed of the above two. It should be understood that the image shot by the conventional camera is a two-dimensional image.

A light field camera as a professional photographic device is generally presented independently, which not only includes the lens assembly and the image sensor, but also is provided with a microlens matrix between the image sensor and the lens assembly, such that light passing through the lens assembly is further refracted by the microlens matrix, before collected by the image sensor. Since the microlens matrix includes a plurality of microlenses with different angles, the image collected by the image sensor includes depth information of an object. That is, the image obtained by shooting is a three-dimensional image.

In the related art, it is common that the conventional camera and the light field camera are presented independently and there is not provided a method yet that shoots the three-dimensional image and the two-dimensional image by one same electronic device.

For this, the present disclosure provides in examples an image acquiring method that enables an electronic device to switch between the light field camera and the conventional camera, thus achieving shooting the two-dimensional image or the three-dimensional image as user desired according to examples of the present disclosure.

Figure 1:
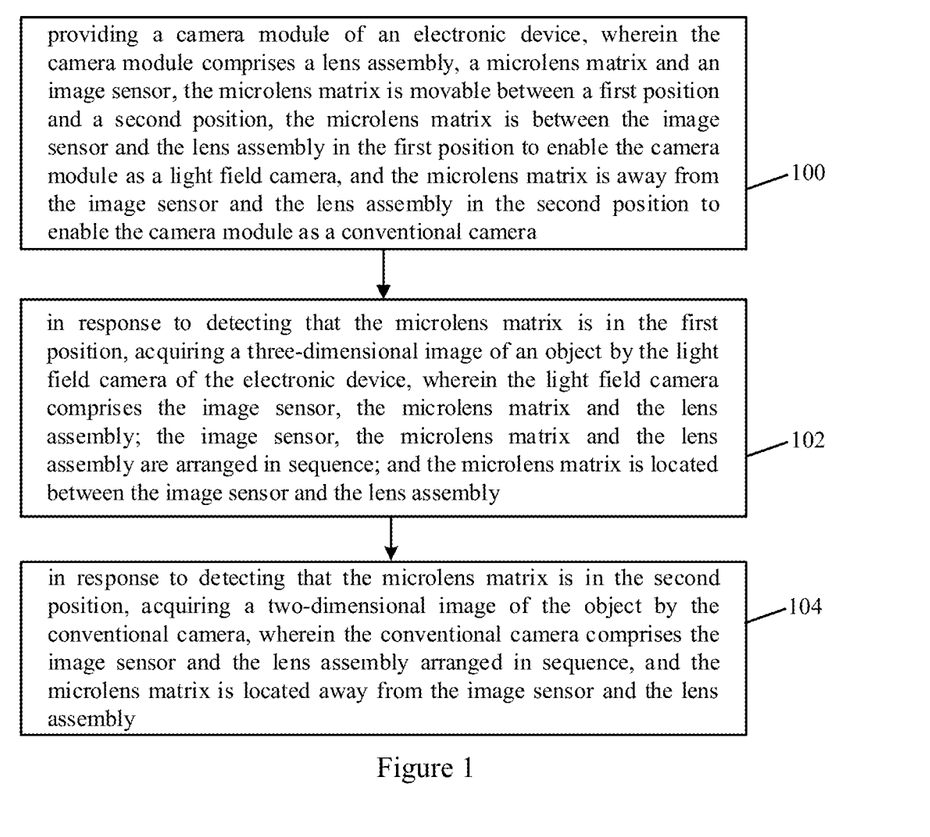
FIG. 1 is a flow chart illustrating an image acquiring method according to one or more examples of the present disclosure.

FIG. 1 is a flow chart illustrating an image acquiring method according to an example of the present disclosure, and the method is applied to an electronic device, where a camera module of the electronic device includes an image sensor, a microlens matrix and a lens assembly. As shown in FIG. 1, the method includes the following steps 100, 102 and 104.

In the step 100, a camera module of an electronic device is provided, where the camera module includes a lens assembly, a microlens matrix and an image sensor, the microlens matrix is movable between a first position and a second position, the microlens matrix is between the image sensor and the lens assembly in the first position to enable the camera module as a light field camera, and the microlens matrix is away from the image sensor and the lens assembly in the second position to enable the camera module as a conventional camera.

In the step 102, a three-dimensional image of an object is acquired by a light field camera including the image sensor, the microlens matrix and the lens assembly arranged in sequence, in response to detecting that the microlens matrix is in the first position between the image sensor and the lens assembly.

From the above, in the related art, there is not provided an image acquiring method yet that is capable of shooting the two-dimensional image and the three-dimensional image by one same electronic device. The light field camera only shoots the three-dimensional image of the object; while the conventional camera only shoots the two-dimensional image.

In view of the above, in order to enable the electronic device to shoot both the two-dimensional image and the three-dimensional image, the camera module of the electronic device is provided with the movable microlens matrix. Based on that the microlens matrix is located between the image sensor and the lens assembly (i.e., the first position), the three (i.e., the image sensor, the microlens matrix and the lens assembly) are arranged in sequence to compose the light field camera for shooting the three-dimensional image; while based on that the microlens matrix is located away from the image sensor and the lens assembly (i.e., the second position), the image sensor and the lens assembly are arranged in sequence to form the conventional camera for shooting the two-dimensional image. Accordingly, the electronic device is incorporated with the movable microlens matrix, so that the electronic device is enabled to shoot both the two-dimensional image and the three-dimensional image.

In the step 104, a two-dimensional image of the object is acquired by a conventional camera including the image sensor and the lens assembly arranged in sequence, in response to detecting that the microlens matrix is located in the second position away from the image sensor and the lens assembly.

In examples of the present disclosure, the microlens matrix may be moved between different positions in various ways.

In an example, an image acquiring application of the electronic device may be provided with an operational control corresponding to the microlens matrix, such that the microlens matrix may be moved between positions by users themselves. Specifically, in response to that a triggering operation on the operational control is detected by the electronic device, the microlens matrix may be moved between positions. Based on that the microlens matrix is located between the image sensor and the lens assembly previously, the microlens matrix may be removed from the position between the image sensor and the lens assembly in response to detecting the triggering operation; while based on that the microlens matrix is located away from the image sensor and the lens assembly previously, the microlens matrix may be moved to the position between the image sensor and the lens assembly in response to detecting the triggering operation. In actual operation, the microlens matrix may be arranged at two alternative fixed positions to enable the microlens matrix to switch between the two positions, which may be referred to as a first position and a second position in examples of the present disclosure. Based on that the microlens matrix is located at one of the two positions, the microlens matrix is located between the image sensor and the lens assembly; while based on that the microlens matrix is located at the other one of the two positions, the microlens matrix is located away from the image sensor and the lens assembly.

In another example, the electronic device may be provided with an entity component fixedly connected to the microlens matrix, such that the microlens matrix is manually moved between positions via the entity component as user desired, i.e., the microlens matrix is moved to the position between the image sensor and the lens assembly; alternatively the microlens matrix is removed from the position between the image sensor and the lens assembly.

The above example is only illustrative, and how to move the microlens matrix between positions specifically may be determined by those skilled in the art according to the actual needs, which is not limited in the present disclosure.

In addition to the inability of one electronic device to shoot both the two-dimensional image and the three-dimensional image, there are further problems existing in the related art as follows. As the light field camera includes the microlens matrix, the light is refracted multiple times before reaches the image sensor, resulting in the three-dimensional image obtained by the light field camera with low image quality; while with respect to the conventional camera, the light passing through the lens assembly reaches the image sensor directly, thus obtaining the two-dimensional image with high image quality. So far now, there is not provided a method for shooting a three-dimensional image with high image quality in the related art.

In view of the above, on the basis of the above examples, the present disclosure further provides in examples a method for shooting a three-dimensional image with high image quality. Specifically, based on that the object is photographed as desired, the microlens matrix may be arranged to locate between the image sensor and the lens assembly first, to obtain the three-dimensional image of the object by the composed light field camera; and subsequently the microlens matrix is arranged to ocate away from the image sensor and the lens assembly, to obtain the two-dimensional image of the object by the composed conventional camera. In this process, depth information of the object is acquired along with obtaining the three-dimensional image. On this basis, the two-dimensional image obtained may be processed according to the acquired depth information, to obtain a final image. It should be understood that, based on the two-dimensional image with high image quality obtained by the conventional camera, the two-dimensional image with high image quality will be processed according to the depth information, such that the final image is incorporated with the depth information. That is, the final image is the three-dimensional image with high image quality.

In actual operation, in examples of the present disclosure, the microlens matrix may be moved between positions according to a status of the electronic device. For example, the microlens matrix may be moved to the position between the image sensor and the lens assembly, based on that the image acquiring application of the electronic device is launched; while the microlens matrix may be removed from the position between the image sensor and the lens assembly, based on that a shooting control in the image acquiring application is triggered. Based on that the microlens matrix is already located between the image sensor and the lens assembly when the image acquiring application is not launched, the microlens matrix is not moved in response to that the image acquiring application is launched, and the depth information of the object is acquired directly by the composed light field camera.

In this example, the electronic device may determine whether to move the microlens matrix to the position between the image sensor and the lens assembly according to related information of the image acquiring application without user involvement, thereby realizing automated movement of the microlens matrix.

In examples of the present disclosure, based on that the image acquiring application is launched, it generally means that shooting an image is desired by a user, however it is desirable to acquire a preview image of the object before shooting an image, thus facilitating to composition, focusing and other options by the user. Therefore, in this circumstance, the preview image of the object is further acquired. At this time, the microlens matrix may be arranged to locate between the image sensor and the lens assembly, to shoot the three-dimensional image of the object by the light field camera composed of the microlens matrix, the image sensor and the lens assembly; and on this basis, the three-dimensional image obtained may be taken as the preview image and displayed in a preview interface of the electronic device.

According to the above description of the related art, the three-dimensional image obtained by the light field camera is generally of low image quality. However, in this example, the three-dimensional image obtained by the light field camera is taken as the preview image, rather than the final image. It should be understood that the preview image is for assisting the composition by the user, only requiring a general location of the object to be seen without high image quality desired. The three-dimensional image obtained by the light field camera is sufficient to meet the user's requirements for the preview image. Accordingly, according to examples of the present disclosure, the preview image is obtained by the light field camera composed of the image sensor, the microlens matrix and lens assembly arranged in sequence, thereby meeting the user's requirement on composition of the generated preview image, and meanwhile, obtaining the depth information for the image processing of the above-described two-dimensional image.

In examples of the present disclosure, light information is actually detected by the image sensor; and based on that the depth information of the object is required, the light information is analyzed and processed. Specifically, light passing through the lens assembly and the microlens matrix in sequence may be collected by the image sensor, and the collected light is subjected to depth calculation, thus obtaining the depth information of the object. It should be noted that, in actual operation, it is an image processing unit, or an image processor in the electronic device that is responsible for the depth calculation for the light.

After the depth information is obtained, the microlens matrix may be removed from the position between the image sensor and the lens assembly, such that the object is shot by the conventional camera composed of the image sensor and the lens assembly.

In examples of the present disclosure, the acquired depth information may be taken to adjust a shooting parameter of the conventional camera. For example, the acquired depth information may be taken for focusing based on that the two-dimensional image is shot by the conventional camera. Specifically, a distance between the image sensor and the lens assembly may be changed according to the acquired depth information for autofocus on the object, based on that the microlens matrix is located between the image sensor and the lens assembly.

It should be understood that the depth information may reflect the distance between the object and the electronic device, equivalent to reflecting an object distance; while adjusting the distance between the image sensor and the lens assembly is equivalent to adjusting an image distance. Accordingly, adjusting the distance between the image sensor and the lens assembly according to the depth information is equivalent to adjusting the image distance based on the object distance, thus allowing precise focusing, and further improving the image quality of the two-dimensional image obtained in the earlier stage.

In examples of the present disclosure, the obtained two-dimensional image is further subjected to image processing according to the acquired depth information, to achieve desired frame effect, where the most basic processing is to incorporate the depth information to the two-dimensional image, such that the final image obtained is a three-dimensional image with high image quality.

In addition to the above, in some other examples, the two-dimensional image may be subjected to other processing according to the depth information.

In an example, based on that the two-dimensional image is obtained, autofocus may be performed again on the two-dimensional image according to the depth information. For example, a focus point of the two-dimensional image may be adjusted according to the depth information, such that the user's visual focus is shifted in the process of watching the two-dimensional image. Specifically, based on that the object is a person and the focus point is on the person's eyes at first, the focus point may be shifted to the upper body by use of the depth information, such that the user's visual focus is shifted from the person's face to clothing of the person, in the process of watching the image.

In another example, based on that the two-dimensional image is obtained, background in the two-dimensional image may be identified according to the acquired depth information; and the background identified is subjected to blur processing. It should be understood that the depth information records the distance between the object and the electronic device, accordingly the background is distinguishable in the two-dimensional image and is further subjected to the blur processing, which is equivalent to bokeh of the two-dimensional image, i.e., achieving bokeh effect according to the depth information. Here, the background may be a part of the image which is far away from focal plane, regardless of its distance from the camera.

The above example is only illustrative, and it should be understood that the two-dimensional image may be processed according to the depth information in various ways, specific of which may be determined by those skilled in the art according to actual needs, and is not limited in the present disclosure.

In examples of the present disclosure, the lens assembly described above includes at least one lens. For example, the lens assembly may include one lens only. For another example, the lens assembly may include a main lens, a wide angle lens, an ultra-wide angle lens and other lenses. The specific number of lenses included and the type of each lens may be determined by those skilled in the art according to an actual situation, which is not limited in the present disclosure.

It should be noted that the electronic device in examples of the present disclosure may be any type of the electronic device. For example, the electronic device may be a mobile terminal such as a smart phone, a tablet computer and the like, or may be a fixed terminal such as a smart TV, a Personal Computer (PC) and the like. It should be understood that any electronic device equipped with the camera module, may be taken as the electronic device in examples of the present disclosure, and which type of the electronic device to be applied to may be determined by those skilled in the art according to actual needs, which is not limited in the present disclosure.

In examples of the present disclosure, the camera module of the electronic device includes the image sensor, the microlens matrix and the lens assembly. The microlens matrix may be located between the image sensor and the lens assembly, or may be located away from the image sensor and the lens assembly. Based on that the three-dimensional image of the object is required, the microlens matrix is moved to the position between the image sensor and the lens assembly, so as to obtain the three-dimensional image of the object by the composed light field camera; while based on that the two-dimensional image of the object is required, the microlens matrix is arranged to located away from the image sensor and the lens assembly, so as to obtain the two-dimensional image of the object by the composed conventional camera.

It should be understood that, in examples of the present disclosure, the microlens matrix may be in two modes, i.e., located between the image sensor and the lens assembly, or located away from the image sensor and the lens assembly, and thus composing the light field camera and the conventional camera, respectively. The composed light field camera is for shooting the three-dimensional image; while the composed conventional camera is for shooting the two-dimensional image. It would be understood that, in examples of the present disclosure, the movable microlens matrix enables the electronic device to move the microlens matrix between positions as user's desired, thus composing the light field camera or the conventional camera, i.e., enabling the electronic device to shoot both the two-dimensional image and the three-dimensional image, thereby avoiding the problem in the related art that the two-dimensional image and the three-dimensional image cannot be obtained by one same electronic device.

In examples of the present disclosure, based on that the three-dimensional image with high image quality is required, the microlens matrix may be arranged to locate between the image sensor and the lens assembly at first, to obtain the depth information of the object by the composed light field camera; and then the microlens matrix is arranged to located away from the image sensor and the lens assembly, to obtain the two-dimensional image of the object by the composed the conventional camera. Accordingly, the obtained two-dimensional image may be processed according to the acquired depth information, to obtain the final image. It should be understood that, the microlens matrix located between the image sensor and the lens assembly, or located away from the image sensor and the lens assembly, composes the light field camera and the conventional camera, respectively. The composed light field camera is for acquiring the depth information; while the composed conventional camera is for shooting the two-dimensional image. It would be understood that the depth information of the object is obtained by the light field camera, and the two-dimensional image is further obtained by the conventional camera. In other words, the obtained two-dimensional image is processed according to the acquired depth information, thus obtaining the three-dimensional image with high image quality, thereby avoiding the problem in the related art that the three-dimensional image with high image quality cannot be obtained, i.e., avoiding the problem that the obtained image only exhibits one of the depth information and the high image quality.

In examples of the present disclosure, based on that the microlens matrix is located between the image sensor and the lens assembly, the three-dimensional image obtained by the light field camera may be taken as the preview image, and displayed in the preview interface of the electronic device. It should be understood that, the preview image is for assisting the composition and other operations by the user without high image quality desired. Accordingly, the preview image is generated, and the depth information of the object is obtained at the same time instead of separately, thus greatly improving efficiency of obtaining the final image.

For achieving the above examples, the present disclosure provides in examples a camera module.

Figure 2:
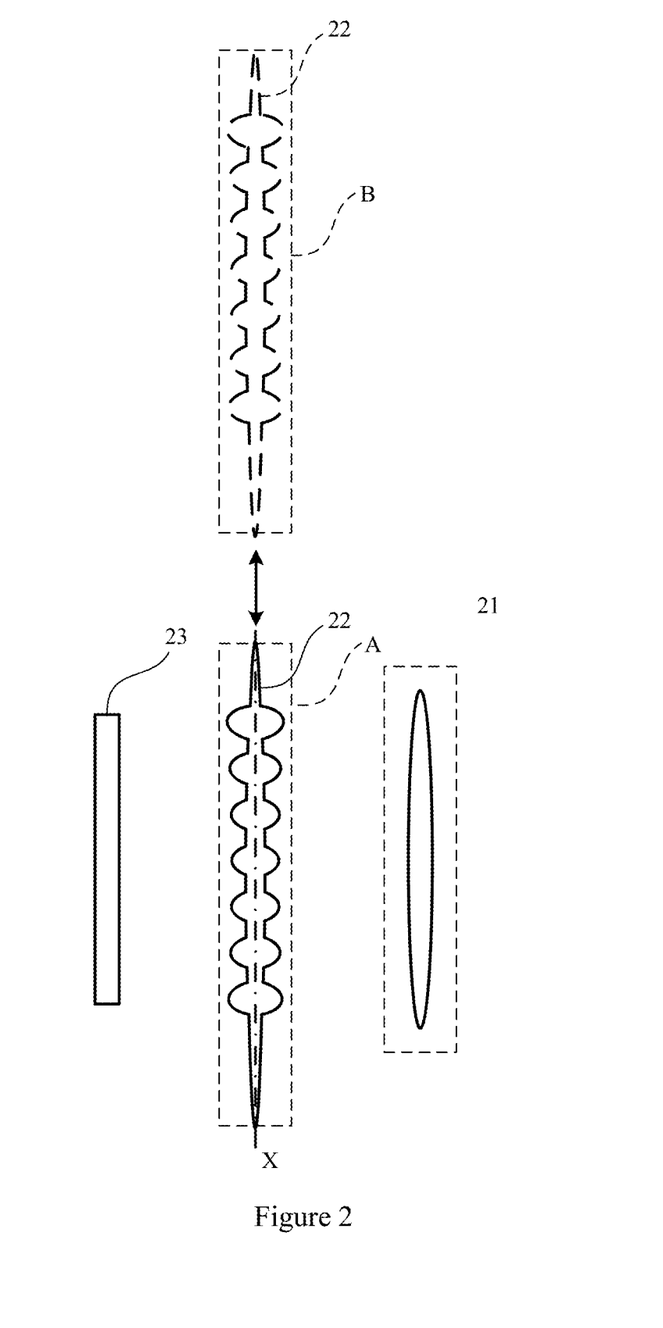
FIG. 2 is a schematic diagram illustrating a camera module according to one or more examples of the present disclosure.

FIG. 2 is a schematic diagram illustrating a camera module according to an example of the present disclosure. As shown in FIG. 2, the camera module includes: a lens assembly 21, a microlens matrix 22 and an image sensor 23.

The lens assembly 21 includes at least one lens.

The microlens matrix 22, composed of a plurality of microlenses, is movable to a position between the image sensor 21 and the lens assembly 23, or removable from the position between the image sensor 21 and the lens assembly 23.

The image sensor 23 is for collecting light passing through the lens assembly 21, or collecting light passing through the lens assembly 21 and the microlens matrix 22 in sequence.

In examples of the present disclosure, the lens assembly 21 may include at least one lens, and FIG. 2 is an example of the lens assembly 21 including one lens. The microlens matrix 22 is movable between the position A and the position B as shown in FIG. 2, such that the microlens matrix 22 may be located between the image sensor 23 and the lens assembly 21, or may be located away from the image sensor 23 and the lens assembly 21.

It should be noted that the position B shown in FIG. 2 is only for illustration; and the actual position of the position B is generally related to the way how the microlens matrix 22 moves in actual operation. For example, the microlens matrix 22 may move up and down in a way by translation, where the position B may be arranged as shown in FIG. 2; while the microlens matrix 22 may move in a way by rotation between the position A and the position B perpendicular to each other, as shown in FIG. 3 specifically.

Figure 3:
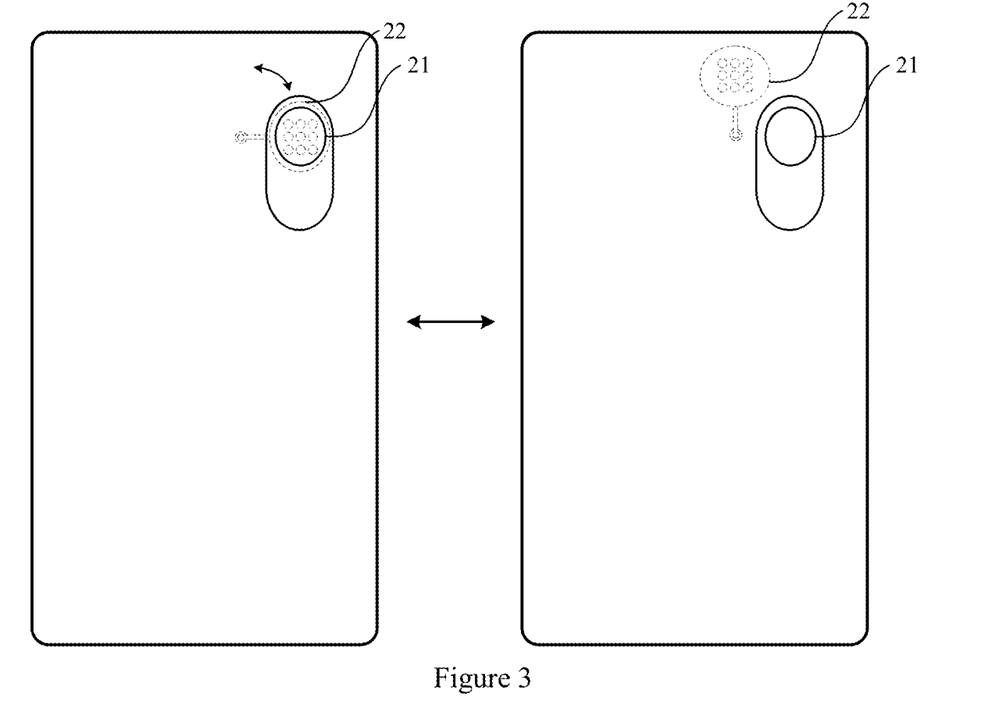
FIG. 3 is a schematic diagram illustrating movement of a microlens matrix according to one or more examples of the present disclosure.

It should be understood that FIG. 3 shows rotation at the X plane in FIG. 2. In FIG. 3, the left panel shows arrangement that the microlens matrix 22 is located between the image sensor 23 and the lens assembly 21; and the right panel shows arrangement where the microlens matrix 22 is located away from the image sensor 23 and the lens assembly 21.

The above examples are only illustrative, and the specific way how to move the microlens matrix 22 may be determined by those skilled in the art according to the actual situation, as long as the microlens matrix 22 is located between or is located away from the image sensor 23 and the lens assembly 21 by being moved, which is not limited in the present disclosure.

In actual operation, the camera module may further include a drive component (not shown in drawings). The drive component is connected to the microlens matrix 22 and is for controlling the microlens matrix 22 to move to a position between the image sensor 21 and the lens assembly 23, or to remove from the position between the image sensor 21 and the lens assembly 23. The drive component may drive the microlens matrix 22 to move between positions by any existing way, which is not limited in the present disclosure.

From the above description for the camera module, in examples of the present disclosure, the camera module includes the movable microlens matrix which is movable between two positions. Based on that the microlens matrix is located at one position, the microlens matrix is located between the image sensor and the lens assembly; while based on that the microlens matrix is located at the other one position, the microlens matrix is located away from the image sensor and the lens assembly. Accordingly, the camera module is capable of implementing the above image acquiring method, thereby obtaining the three-dimensional image with high image quality.

Reference will be made to the above image acquiring method applied in a smart phone as an example according examples of the present disclosure.

Figure 4:
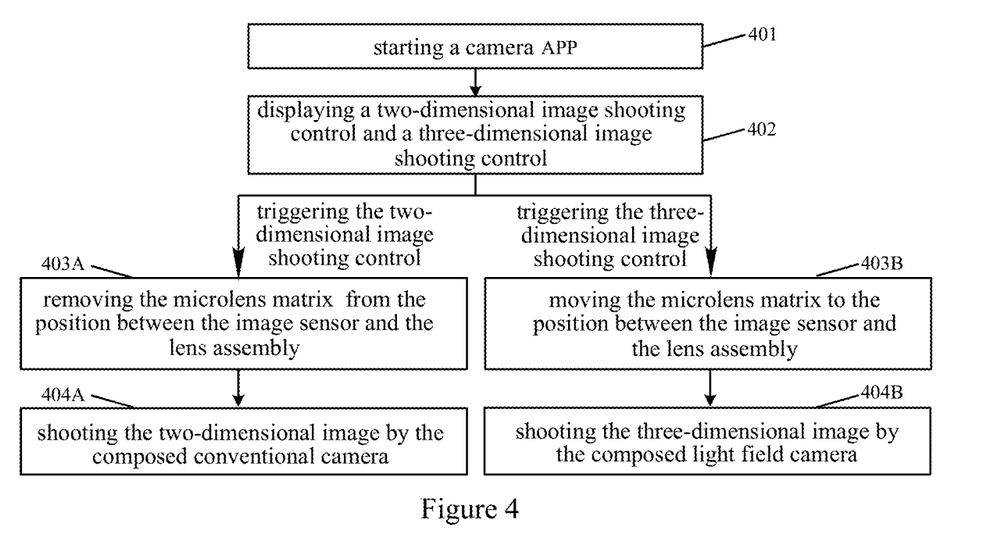
FIG. 4 is a flow chart illustrating another image acquiring method according to one or more examples of the present disclosure.

FIG. 4 is a flow chart illustrating another image acquiring method according to an example of the present disclosure. As shown in FIG. 4, the image acquiring method may include steps 401-404.

In the step 401, a camera application (APP) is launched in response to that a triggering operation on a camera APP icon by a user is detected.

In an example, the smart phone may be installed with the camera APP in advance, serving as the above image acquiring application. Based on that image shooting is desired by a user, the camera APP is launched in response to that the camera APP icon is clicked.

In the step 402, a two-dimensional image shooting control and a three-dimensional image shooting control are displayed.

Based on that the camera APP is launched, a displaying interface corresponding to the camera APP may be displayed; and the displaying interface may include an image shooting option, such as the two-dimensional image shooting control and the three-dimensional image shooting control, for an easy selection of the desired image shooting as user's desired.

In the step 403A, the microlens matrix is removed from the position between the image sensor and the lens assembly, in response to that the two-dimensional image shooting control being triggered is detected.

In an example, the microlens matrix is removed from the position between the image sensor and the lens assembly in response to that the two-dimensional image shooting control is triggered by the user, thus composing the conventional camera for shooting the two-dimensional image of an object.

It should be noted that, in this example, the two-dimensional image shooting control corresponds to two commands, i.e., "selecting to shoot a two-dimensional image" and "executing a shooting operation". Accordingly, in response to that the two-dimensional image shooting control being triggered is detected, the smart phone implements two operations successively, i.e., "removing the microlens matrix from the position between the image sensor and the lens assembly" and "shooting an image". In actual operation, two separate controls may be provided corresponding to the two commands respectively, i.e., "selecting to shoot a two-dimensional image" and "executing a shooting operation". The two-dimensional image shooting control may be specifically set in a manner determined by those skilled in the art according to actual needs, which is not limited in the present disclosure.

It should be noted that the step 403A is described here as an example where the microlens matrix is located between the image sensor and the lens assembly at first; accordingly the microlens matrix is removed in response to that the two-dimensional image shooting control is trigger. It should be understood that, based on that the microlens matrix is located away from the image sensor and the lens assembly at first, the microlens matrix is not moved in the step 403A.

In the step 404A, the two-dimensional image is shot by the conventional camera composed of the image sensor and the lens assembly.

In the step 403B, the microlens matrix is moved to the position between the image sensor and the lens assembly, in response to that the three-dimensional image shooting control being triggered is detected.

In an example, the microlens matrix is moved to the position between the image sensor and the lens assembly in response to that the three-dimensional image shooting control is triggered by the user, thus composing the light field camera for shooting the three-dimensional image of an object.

Similar to setting of the two-dimensional image shooting control, the step 403B is described here as an example where the three-dimensional image shooting control corresponds to two commands, i.e., "selecting to shoot a three-dimensional image" and "executing a shooting operation". In actual operation, two separate controls may be provided corresponding to the two commands respectively. The three-dimensional image shooting control may be set with reference to the description in the step 403A, which will not be repeated here.

In the step 404B, the three-dimensional image is shot by the light field camera composed of the image sensor, the microlens matrix and the lens assembly.

From the above examples, a shooting mode may be adjusted for image shooting as user's requirement. Based on that the two-dimensional image is desired, the two-dimensional image shooting control is selected such that the microlens matrix is arranged to locate away from the image sensor and the lens assembly, thus composing the conventional camera for shooting the two-dimensional image; while based on that the three-dimensional image is desired, the three-dimensional image shooting control is selected such that the microlens matrix is arranged to locate between the image sensor and the lens assembly, thus composing the light field camera for shooting the three-dimensional image, thereby obtaining the two-dimensional image and the three-dimensional image by one electronic device.

Reference will be made to the above method for shooting a three-dimensional image with high image quality that is applied in a smart phone as an example according examples of the present disclosure.

Figure 5:
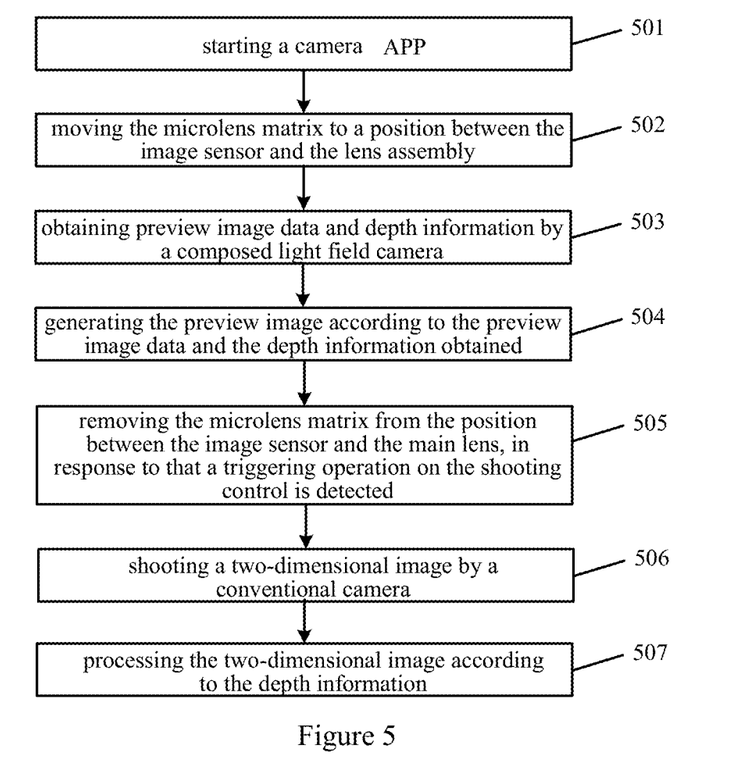
FIG. 5 is a flow chart illustrating still another image acquiring method according to one or more examples of the present disclosure.

FIG. 5 is a flow chart illustrating still another image acquiring method according to an example of the present disclosure. As shown in FIG. 5, the method may include steps 501 to 507.

In the step 501, a camera application (APP) is launched in response to that a triggering operation on a camera APP icon by a user is detected.

In an example, the smart phone may be installed with the camera APP in advance, serving as the above image acquiring application. Based on that image shooting is desired by a user, the camera APP is launched in response to that the camera APP icon is clicked.

Based on that the camera APP is launched, a displaying interface corresponding to the camera APP may be displayed; and the displaying interface may include a preview area, a shooting control and the like.

In the step 502, the microlens matrix is moved to the position between the image sensor and the lens assembly.

In an example, the smart phone is capable of moving the microlens matrix between positions automatically according to a state of the camera APP. Based on that the camera APP is launched by the user and the shooting control is not triggered, the microlens matrix is moved to the position between the image sensor and the main lens by default, for obtaining a preview image and depth information of an object by a light field camera composed of the image sensor, the microlens matrix and the main lens.

In the step 503, preview image data and depth information are obtained by a light field camera composed of the image sensor, the microlens matrix and the lens assembly arranged in sequence.

In an example, as the light field camera obtains the preview image, the smart phone obtains the preview image and the depth information of the object both.

In the step 504, the preview image is generated according to the preview image data and the depth information obtained, and the preview image is displayed in the displaying interface of the camera APP.

In an example, based on that the preview image data and depth information are obtained by the composed light field camera, the preview image may be generated according to the preview image data and the depth information obtained, such that a position of the smart phone is adjusted for convenience of composition according to where the object is located in the preview image.

It should be noted that, the preview image data in this example refers to other image data except for the depth information in the three-dimensional image. In this example, the three-dimensional image obtained is taken as the preview image.

In the step 505, the microlens matrix is removed from the position between the image sensor and the main lens, in response to detecting a triggering operation on the shooting control by the user.

In an example, based on that composition of the object is achieved according to the preview image, the shooting control in the camera APP may be triggered to shoot the object. As the image shot by the light field camera is of low image quality, in this example, in response to that the shooting control being triggered is detected, the microlens matrix is removed from the position between the image sensor and the main lens in the smart phone, thus composing the conventional camera of the image sensor and the main lens for shooting the object.

In the step 506, the two-dimensional image is shot by the conventional camera composed of the image sensor and the main lens.

In an example, it should be understood that the two-dimensional image obtained is of high image quality, because the microlens matrix is removed in response to that the triggering operation on the shooting control is detected.

In the step 507, the two-dimensional image is processed according to the depth information.

In an example, based on that the depth information and the two-dimensional image are acquired, the two-dimensional image may be processed according to the depth information, such that a processed final image is an image with high image quality (i.e., a three-dimensional image with high image quality) incorporating with the depth information. It should be understood that the depth information is incorporated to the image, such that the final image exhibits a stronger sense of depth or stereoscopic effect than the two-dimensional image.

In actual operation, the two-dimensional image may be subjected to other processing (such as performing autofocus again, bokeh, and so on) according to the depth information, which may be determined specifically by those skilled in the art according to actual situation, which is not limited in the present disclosure.

From the above examples, the present image acquiring method is capable of moving the microlens matrix between positions automatically in response to the state of the image acquiring application. Based on that the image acquiring application is launched and the shooting control is not triggered, the microlens matrix is moved to the position between the image sensor and the main lens, thus allowing obtaining the preview image and the depth information of the object by the composed light field camera. Based on that the shooting control is trigged, the microlens matrix is removed from the position between the image sensor and the main lens, thus allowing shooting the two-dimensional image by the composed conventional camera, thereby avoiding the problem of low image quality due to shooting the image by the light field camera.

According to example of the present disclosure, it should be understood that taking a characteristic of low requirement on the image quality for the preview image, the preview image is acquired by the composed light field camera. The three-dimensional image obtained by the light field camera is sufficient to meet the user's requirements for the preview image. Besides, the smart phone is capable of obtaining the depth information of the object in addition to the preview image because of the light field camera. Further, in examples of the present disclosure, it is judged whether image shooting is desired according to whether the shooting control is triggered. In response to that the shooting control is triggered, the microlens matrix is removed, which is equivalent to shooting the image by the conventional camera, thereby ensuring the obtained two-dimensional image to exhibit high image quality. Accordingly, the two-dimensional image shot by the conventional camera is processed according to the depth information, such that the obtained final image exhibits the depth information and the high image quality both. That is, the final image is the three-dimensional image with high image quality.

Figure 6:
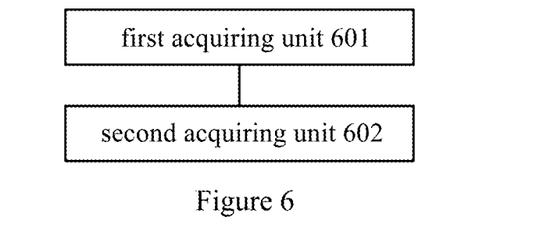
FIG. 6 is a block diagram of an image acquiring apparatus, according to one or more examples of the present disclosure.

FIG. 6 is a block diagram of an image acquiring apparatus, according to an example of the present disclosure. As shown in FIG. 6, the apparatus includes a first acquiring unit 601 and a second acquiring unit 602.

The first acquiring unit 601 is configured to acquire a three-dimensional image of an object by a light field camera composed of the image sensor, the microlens matrix and the lens assembly arranged in sequence, based on that the microlens matrix is located between the image sensor and the lens assembly.

The second acquiring unit 602 is configured to acquire a two-dimensional image of the object by a conventional camera composed of the image sensor and the lens assembly arranged in sequence, based on that the microlens matrix is located away from the image sensor and the lens assembly.

In one or more examples, the electronic device is provided with an entity component fixedly connected to the microlens matrix, such that the microlens matrix is moved manually by a user to a position between the image sensor and the lens assembly via the entity component, or the microlens matrix is removed from the position between the image sensor and the lens assembly.

Figure 7:
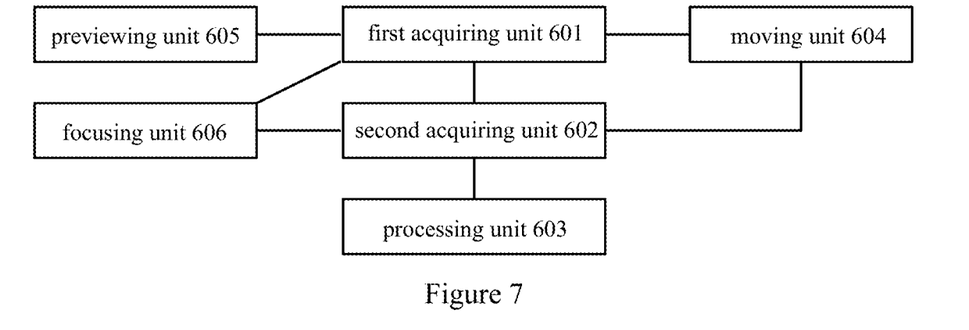
FIG. 7 is a block diagram of another image acquiring apparatus, according to one or more examples of the present disclosure.

FIG. 7 is a block diagram of another image acquiring apparatus, according to an example of the present disclosure. As shown in FIG. 7, based on the example shown in FIG. 6 above, this example further includes: a processing unit 603, a moving unit 604, a previewing unit 605 and a focusing unit 606.

In one or more examples, the processing unit 603 is configured to acquire depth information of the object, and process the two-dimensional image according to the depth information to obtain a final image.

In one or more examples, the moving unit 604 is configured to move the microlens matrix to a position between the image sensor and the lens assembly, based on that the image acquiring application of the electronic device is launched; and remove the microlens matrix from the position between the image sensor and the lens assembly, based on that a shooting control in the image acquiring application is triggered.

In one or more examples, the previewing unit 605 is configured to take the three-dimensional image obtained as a preview image, and display the preview image in a preview interface of the electronic device, based on that the microlens matrix is located between the image sensor and the lens assembly.

In one or more examples, the focusing unit 606 is configured to change a distance between the image sensor and the lens assembly according to the depth information for autofocus on the object, based on that the microlens matrix is located between the image sensor and the lens assembly.

In one or more examples, the moving unit 604 is further configured to allow the microlens matrix to be at the first position, in response to detecting a triggering operation to the operational control by a user, where the microlens matrix is maintained between the image sensor and the lens assembly, in response to detecting that the microlens matrix is at the first position; and the microlens matrix is moved to the first position between the image sensor and the lens assembly, in response to detecting that the microlens matrix is at the second position.

In one or more examples, the processing unit 603 is further configured to perform autofocus again for the two-dimensional image according to the depth information to obtain the final image.

In one or more examples, the processing unit 603 is further configured to identify background in the two-dimensional image according to the depth information, and blur the background.

In one or more examples, the first acquiring unit 601 is further configured to collect light passing through the lens assembly and the microlens matrix in sequence by the image sensor, and subject the light collected to depth calculation, to obtain the depth information of the object.

For the apparatus examples, reference may be made to the related description for the method example, as the apparatus examples corresponds to the method examples. The above description for the apparatus example is merely for illustration, where units described as separate components may or may not be physically separate; while components presenting as a unit may or may not a physical unit, i.e., may be located in one place, or may be distributed over multiple network units. Partial or entire module may be selected according to actual requirements to achieve the objectives of the present disclosure. Examples of the present disclosure can be understood and implemented by those ordinary skilled in the art without creative efforts.

Accordingly, the present disclosure further provides in examples an image acquiring apparatus, including: a processor, and a memory, storing a processor-executable instruction, where the processor, by executing the executable instruction, is configured to implement an image acquiring method as described in any of the above examples. For example, the image acquiring method may include: providing a camera module of an electronic device, where the camera module includes a lens assembly, a microlens matrix and an image sensor, the microlens matrix is movable between a first position and a second position, the microlens matrix is between the image sensor and the lens assembly in the first position to enable the camera module as a light field camera, and the microlens matrix is away from the image sensor and the lens assembly in the second position to enable the camera module as a conventional camera; in response to detecting that the microlens matrix is in the first position, acquiring a three-dimensional image of an object by the light field camera of the electronic device, where the light field camera includes the image sensor, the microlens matrix and the lens assembly; the image sensor, the microlens matrix and the lens assembly are arranged in sequence; and the microlens matrix is located between the image sensor and the lens assembly; and in response to detecting that the microlens matrix is in the second position, acquiring a two-dimensional image of the object by the conventional camera, where the conventional camera includes the image sensor and the lens assembly arranged in sequence, and the microlens matrix is located away from the image sensor and the lens assembly.

Accordingly, the present disclosure further provides in examples an electronic device including a processor, a memory, and one or more programs stored in the memory. The processor is configured to implement one or more programs which includes instructions for achieving the image acquiring method as described in any of the above examples. For example, the image acquiring method may include: providing a camera module of an electronic device, where the camera module includes a lens assembly, a microlens matrix and an image sensor, the microlens matrix is movable between a first position and a second position, the microlens matrix is between the image sensor and the lens assembly in the first position to enable the camera module as a light field camera, and the microlens matrix is away from the image sensor and the lens assembly in the second position to enable the camera module as a conventional camera; in response to detecting that the microlens matrix is in the first position, acquiring a three-dimensional image of an object by the light field camera of the electronic device, where the light field camera includes the image sensor, the microlens matrix and the lens assembly; the image sensor, the microlens matrix and the lens assembly are arranged in sequence; and the microlens matrix is located between the image sensor and the lens assembly; and in response to detecting that the microlens matrix is in the second position, acquiring a two-dimensional image of the object by the conventional camera, where the conventional camera includes the image sensor and the lens assembly arranged in sequence, and the microlens matrix is located away from the image sensor and the lens assembly.

Figure 8:
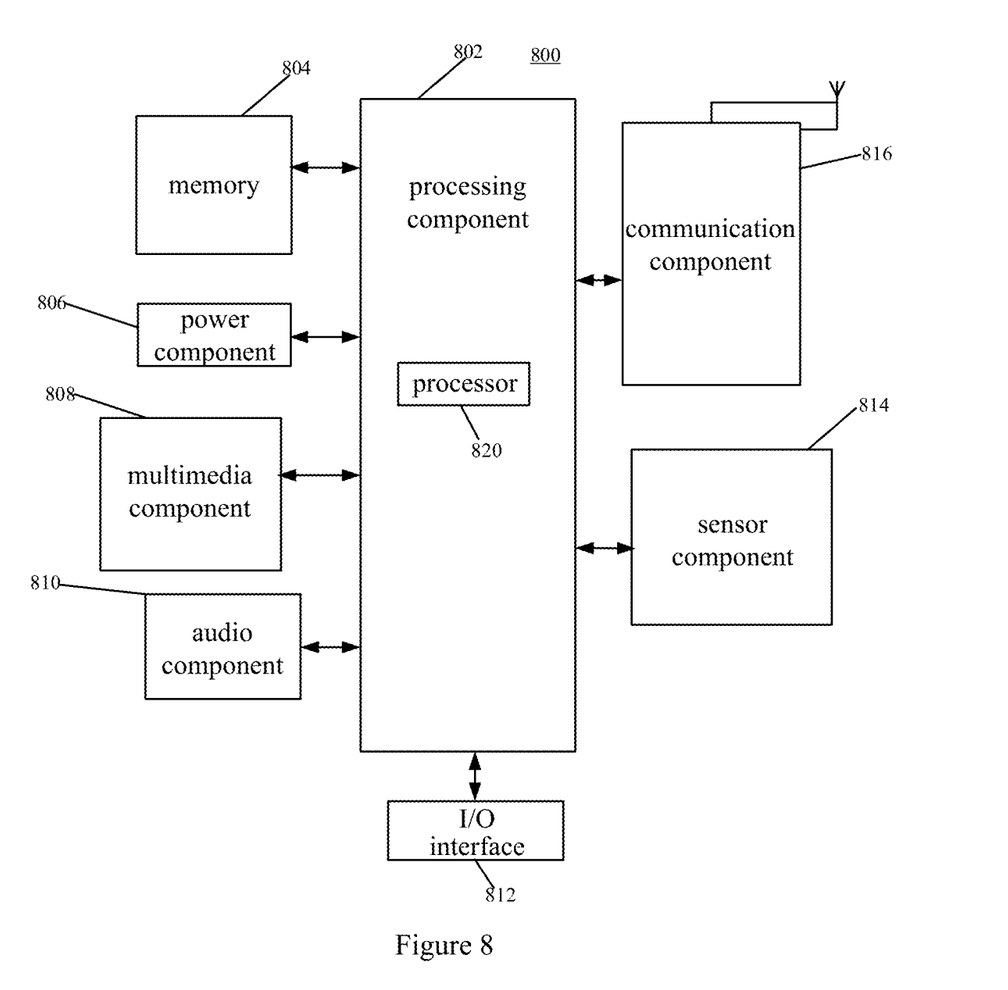
FIG. 8 is a block diagram of an electronic device, according to one or more examples of the present disclosure.

FIG. 8 is a block diagram of a device 800 for implementing an image acquiring method, according to an example of the present disclosure.

Referring to FIG. 8, the device 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the device 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the device 800. Examples of such data include instructions for any applications or methods operated on the device 800, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the device 800. The power component 806 may include a power management system, one or more power sources, and any other components associated with the generation, management, and distribution of power in the device 800.

The multimedia component 808 includes a screen providing an output interface between the device 800 and the user. In some examples, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some examples, the multimedia component 808 includes a front-facing camera and/or a rear-facing camera. When the user equipment 800 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 810 is configured to output and/or input audio signals. For example, the audio component 810 includes a microphone (MIC) configured to receive an external audio signal when the device 800 is in an operation mode, such as a call mode, a recording mode, and a voice recognition mode. The received audio signal may be further stored in the memory 804 or transmitted via the communication component 816. In some examples, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the device 800. For instance, the sensor component 814 may detect an open/closed status of the device 800, relative positioning of components, e.g., the display and the keypad, of the device 800, a change in position of the device 800 or a component of the device 800, a presence or absence of user contact with the device 800, an orientation or an acceleration/deceleration of the device 800, and a change in temperature of the device 800. The sensor component 814 may include a proximity sensor configured to detect the presence of nearby objects without any physical contact. The sensor component 814 may also include a light sensor, such as a CMOS or CCD image sensor, for use in imaging applications. In some examples, the sensor component 814 may also include an accelerometer sensor, a gyroscope sensor, a magnetic sensor, a pressure sensor, or a temperature sensor.

The communication component 816 is configured to facilitate communication, wired or wirelessly, between the device 800 and other devices. The device 800 may access a wireless network based on a communication standard, such as WiFi, 2G, or 3G, 4G LTE, 5G New Radio (NR) or a combination thereof. In one example, the communication component 816 receives a broadcast signal or broadcast associated information from an external broadcast management system via a broadcast channel. In one example, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In examples, the device 800 may be implemented with one or more application specific integrated circuits (ASIC), digital signal processors (DSP), digital signal processing devices (DSPD), programmable logic devices (PLD), field programmable gate arrays (FPGA), controllers, micro-controllers, microprocessors, or other electronic components, for performing the above described methods.

In examples, there is also provided a non-transitory computer readable storage medium including instructions, such as included in the memory 804, executable by the processor 820 in the device 800, for performing the above-described methods. For example, the non-transitory computer-readable storage medium may be a ROM, a random access memory (RAM), a CD-ROM, a magnetic tape, a floppy disc, an optical data storage device, and the like.

Other examples of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

The above descriptions are only preferred examples of the present disclosure, and are not intended to limit the present disclosure. Any modifications, equivalent substitutions, improvements, etc. made within the spirit and principles of the present disclosure shall be included in the scope of the present disclosure.

What is claimed is:

1. An image acquiring method, comprising:
providing a camera module of an electronic device, wherein the camera module comprises a lens assembly, a microlens matrix, an operational control, an image sensor, and a drive component connected to the microlens matrix and configured to control movement of the microlens matrix between a first position, located between the image sensor and the lens assembly, and a second position located away from the image sensor and the lens assembly, wherein the microlens matrix is movable between the first position and the second position, wherein the microlens matrix is between the image sensor and the lens assembly in the first position to enable the camera module as a light field camera, and wherein the microlens matrix is away from the image sensor and the lens assembly in the second position to enable the camera module as a conventional camera;
in response to detecting that the microlens matrix is in the first position, acquiring a three-dimensional image of an object by the light field camera of the electronic device, wherein the light field camera comprises the image sensor, the microlens matrix and the lens assembly, wherein the image sensor, the microlens matrix and the lens assembly are arranged in sequence; and the microlens matrix is located between the image sensor and the lens assembly, and wherein the first position is detected via a triggering operation to an operational control by a user;

in response to detecting that the microlens matrix is in the second position, acquiring a two-dimensional image of the object by the conventional camera, wherein the conventional camera comprises the image sensor and the lens assembly arranged in sequence, and the microlens matrix is located away from the image sensor and the lens assembly, in response to launching an image acquiring application of the electronic device, moving the microlens matrix to the first position and acquiring depth information of the object;

in response to triggering a shooting control in the image acquiring application, removing the microlens matrix from the first position, and acquiring the two-dimensional image of the object; and processing the two-dimensional image according to the depth information to obtain a final image.

2. The method according to claim 1, wherein the electronic device comprises an entity component fixedly connected to the microlens matrix, wherein the microlens matrix is moved manually by a user to the first position between the image sensor and the lens assembly via the entity component, or the microlens matrix is moved to the second position away from the image sensor and the lens assembly via the entity component.

3. The method according to claim 1, further comprising:
taking the three-dimensional image obtained by shooting as a preview image, and displaying the preview image in a preview interface of the electronic device, in response to detecting that the microlens matrix is located at the first position between the image sensor and the lens assembly.

4. The method according to claim 1, wherein acquiring depth information of the object comprises:
collecting light passing through the lens assembly and the microlens matrix in sequence by the image sensor, and subjecting the light collected to depth calculation to obtain the depth information of the object.

5. The method according to claim 1, further comprising:
changing a distance between the image sensor and the lens assembly according to the depth information for autofocus on the object, in response to detecting that the microlens matrix is located at the second position away from the image sensor and the lens assembly.

6. The method according to claim 1, wherein processing the two-dimensional image based on the depth information to obtain a final image comprises:
performing autofocus again for the two-dimensional image according to the depth information to obtain the final image.

7. The method according to claim 1, wherein processing the two-dimensional image according to the depth information to obtain a final image comprises:
identifying background in the two-dimensional image according to the depth information, and blurring the background.

8. A camera module, comprising: a lens assembly, a microlens matrix an image sensor, an image acquiring application, a drive component configured to move the microlens matrix between a first position located between the image sensor and the lens assembly, and a second position located away from the image sensor and the lens assembly, and an operational control connected to the microlens matrix and configured to control movement of the microlens matrix, wherein the lens assembly includes at least one lens;

the microlens matrix includes a plurality of microlenses, movable between the first position and the second position, wherein the microlens matrix is between the image sensor and the lens assembly in the first position to enable the camera module as a light field camera, and the microlens matrix is away from the image sensor and the lens assembly in the second position to enable the camera module as a conventional camera; and the image sensor is configured to collect light passing through the lens assembly, or collect light passing through the lens assembly and the microlens matrix in sequence; and wherein the camera module is configured to:
in response to launching the image acquiring application, move the microlens matrix to the first position, and acquire depth information of an object;

in response to triggering a shooting control in the image acquiring application, remove the microlens matrix from the first position, and acquire a two-dimensional image of the object; and process the two-dimensional image according to the depth information to obtain a final image.

9. An electronic device, comprising:
a processor, and
a memory, storing a processor-executable instruction,
wherein the processor, by executing the executable instruction, implements an image acquiring method comprising:

providing a camera module of an electronic device, wherein the camera module comprises a lens assembly, a microlens matrix, an operational control, an image acquiring application, an image sensor, and a drive component connected to the microlens matrix and configured to control movement of the microlens matrix between a first position, located between the image sensor and the lens assembly, and a second position located away from the image sensor and the lens assembly, wherein the microlens matrix is movable between the first position and the second position, wherein the microlens matrix is between the image sensor and the lens assembly in the first position to enable the camera module as a light field camera, and wherein the microlens matrix is away from the image sensor and the lens assembly in the second position to enable the camera module as a conventional camera;

in response to detecting that the microlens matrix is in the first position, acquiring a three-dimensional image of an object by the light field camera of the electronic device, wherein the light field camera comprises the image sensor, the microlens matrix and the lens assembly, wherein the image sensor, the microlens matrix and the lens assembly are arranged in sequence; and the microlens matrix is located between the image sensor and the lens assembly, and wherein the first position is detected via a triggering operation to an operational control by a user;

in response to detecting that the microlens matrix is in the second position, acquiring a two-dimensional image of the object by the conventional camera, wherein the conventional camera comprises the image sensor and the lens assembly arranged in sequence, and the microlens matrix is located away from the image sensor and the lens assembly, in response to launching the image acquiring application of the electronic device, moving the microlens matrix to the first position, and acquiring depth information of the object;

in response to triggering a shooting control in the image acquiring application, removing the microlens matrix from the first position, and acquiring the two-dimensional image of the object; and processing the two-dimensional image according to the depth information to obtain a final image.

10. The electronic device according to claim 9, wherein the processor is further configured to:

collect light passing through the lens assembly and the microlens matrix in sequence by the image sensor, and subject the light collected to depth calculation to obtain the depth information of the object.

11. The electronic device according to claim 9, wherein the processor is further configured to:

change a distance between the image sensor and the lens assembly according to the depth information for autofocus on the object, in response to detecting that the microlens matrix is located at the second position away from the image sensor and the lens assembly.

12. The electronic device according to claim 9, wherein the processor is further configured to:

perform autofocus again for the two-dimensional image according to the depth information to obtain the final image.

13. The electronic device according to claim 9, wherein the processor is further configured to:

identify background in the two-dimensional image according to the depth information, and blur the background.

\* \* \* \* \*